Patented June 13, 1950

2,511,517

UNITED STATES PATENT OFFICE

2,511,517

METHOD OF PRODUCING OPTICAL GLASS OF VARIED REFRACTIVE INDEX

Harold H. Spiegel, Chicago, Ill., assignor to Bell & Howell Company, Chicago, Ill., a corporation of Illinois No Drawing. Application January 31, 1947, Serial No. 725,737

11 Claims. (Cl. 49—77)

An object of my invention resides in the provision of a novel method of producing an optical glass which is free from strain and the refractive index of which varies continuously in one direction therethrough and is uniform in the direction normal to the former direction, the glass, by reason of it being unstrained, being adapted for the fabrication of optical elements therefrom and, by reason of it having a varied refractive index in the one direction, lending itself to improved lens design as by disposing the optical axis of a lens in correspondence with the direction of varied refractive index of the glass and thus offering the opportunity of aberration correction with spherical lens surfaces which otherwise can be obtained only by difficulty generated elliptical or hyperbolic lens surfaces.

A description of an example of my invention follows.

A glass is produced by my invention by the fusion of a batch containing a substantial quantity of each of the oxides of boron, silicon, lanthanum, barium, and cadmium and a minor quantity of each of the oxides of beryllium and zirconium, the specific proportions of these ingredients being as follows:

| Ingredients | Percentage by weight |
| --- | --- |
| $B_2O_3$ | 13.5 |
| $SiO_2$ | 15 |
| $La_2O_3$ | 17 |
| $BaO$ | 34.8 |
| $CdO$ | 13.3 |
| $BeO$ | 4 |
| $ZrO_2$ | 2 |

The batch containing these ingredients is melted and thoroughly mixed by maintaining it at a temperature between 1320° and 1360° C. for thirty-five minutes and then stirring it for thirty minutes while maintaining it at a temperature between 1300° and 1306° C.

The ingredients of the batch are capable of rearrangement from thoroughly mixed condition to a second condition effecting a varied refractive index in the resulting glass while the batch is in a molten quiescent state, and to effect this rearrangement the batch is maintained in a molten quiescent state for a period sufficient to effect said second condition, after which the batch is solidified while the ingredients are in said second condition.

This rearrangement is effected in the batch above described by maintaining the batch in a molten quiescent state for a period of one hour at a temperature of 1300° C., at which temperature the batch is in a free flowing state, and then gradually reducing the temperature of the batch while still in a quiescent state to 1090° C. in forty minutes at which temperature the batch is in a viscous state. The temperature of the batch while still in a quiescent state is then reduced to 600° C. which is below and in the region of the solidifying temperature of the batch and maintaining it at this temperature for approximately two hours, and finally the temperature of the batch is gradually reduced to normal temperature.

The resulting glass is free from strain and the refractive index thereof varies in the order of .012 of refractive index in .612 inches.

Glass has been produced by my invention by melting and thoroughly mixing it as above described in a pot and thereafter maintaining it in a molten quiescent state in the pot for forty minutes at a temperature of 1300° C., after which the batch is poured into a platinum boat wherein it undergoes the rearrangement and solidifying procedure above described, but it is not thought that this additional procedure is essential.

The nature of the aforesaid rearrangement is not understood, but it is thought that the relatively dense cadmium oxide ingredient partially settles out under the influence of gravity, and if this is the case, the subjection of the batch to a centrifuge operation during the rearrangement period in which the batch is in a molten quiescent state would result in the refractive index variation being radial of the rotational axis established by the centrifuge operation.

While I have thus described my invention, I do not wish to be limited to the precise details described, as changes may be readily made without departing from the spirit of my invention, but having thus described my invention, I claim as new and desire to secure by Letters Patent the following:

1. The method of producing an optical glass which is substantially free from strain and the refractive index of which varies continuously through at least a portion thereof, comprising producing a thoroughly mixed molten batch containing ingredients of different refractive indices and capable of rearrangement from a thoroughly mixed condition to a second condition effecting said varied index of refraction while the batch is in a molten quiescent state, then maintaining the batch in a molten quiescent state for a period of time sufficient to effect said second condition, and finally solidifying the batch while said ingredients are in said second condition.

2. The method of producing an optical glass substantially free from strain and the refractive index of which varies continuously through at least a portion thereof, comprising producing a thoroughly mixed molten batch containing ingredients of different refractive indices and densities and capable of rearrangement from a thoroughly mixed condition to a second condition effecting said varied index of refraction while the batch is in a molten quiescent state, then maintaining the batch in a molten quiescent state for a period of time sufficient to effect said second condition, and finally solidifying the batch while said ingredients are in said second condition.

3. The method of producng an optical glass substantially free from strain and the refractive index of which varies continuously through at least a portion thereof, comprising producing a thoroughly mixed molten batch containing different oxides of which one consists of a substantial quantity of cadmium oxide and said oxides being capable of rearrangement from a thoroughly mixed condition to a second condition effecting said varied index of refraction while the batch is in a molten quiescent state, then maintaining the batch in a molten quiescent state for a period of time sufficient to effect said second condition, and finally solidifying the batch while said oxides are in said second condition.

4. The method of producing an optical glass substantially free from strain and the refractive index of which varies continuously through at least a portion thereof, comprising producing a thoroughly mixed molten batch containing a substantial quantity of each of the oxides of boron, silicon, lanthanum, barium and cadmium and said oxides being capable of rearrangement from a thoroughly mixed condition to a second condition effecting said varied index of refraction while the batch is in a molten quiescent state, then maintaining the batch in a molten quiescent state for a period of time sufficient to effect said second condition, and finally solidifying the batch while said oxides are in said second condition.

5. The method of producing an optical glass substantially free from strain and the refractive index of which varies continuously through at least a portion thereof, comprising producing a thoroughly mixed molten batch containing a substantial quantity of each of the oxides of boron, silicon, lanthanum, barium and cadmium and a minor quantity of each of the oxides of beryllium and zirconium and said oxides being capable of rearrangement from a thoroughly mixed condition to a second condition effecting said varied index of refraction while the batch is in a molten quiescent state, then maintaining the batch in a molten quiescent state for a period of time sufficient to effect said second condition, and finally solidifying the batch while said oxides are in said second condition.

6. The method of producing an optical glass substantially free from strain and the refractive index of which varies continuously through at least a portion thereof, comprising producing a thoroughly mixed molten batch containing approximately 13.5% of boron oxide, 15% of silicon oxide, 17% of lanthanum oxide, 34.8% of barium oxide, 13.3% of cadmium oxide, 4% of beryllium oxide and 2% of zirconium oxide and said oxides being capable of rearrangement from a thoroughly mixed condition to a second condition effecting said varied index of refraction while the batch is in a molten quiescent state, then maintaining the batch in a molten quiescent state for a period of time sufficient to effect said second condition, and finally solidifying the batch while said oxides are in said second condition.

7. The method of producing an optical glass substantially free from strain and the refractive index of which varies continuously through at least a portion thereof, comprising producing a thoroughly mixed molten batch containing ingredients of different refractive indices and capable of rearrangement from a thoroughly mixed condition to a second condition effecting said varied index of refraction while the batch is in a molten quiescent state, then maintaining the batch in a molten quiescent state for a period of time sufficient to effect said second condition and comprising maintaining the batch at a relatively high temperature in which it is in a free flowing state for an appreciable period of time and then gradually reducing the temperature of the batch until it is in a viscous state, then reducing the temperature of the batch while it is still in a quiescent state to a temperature below and in the region of the solidifying temperature thereof and maintaining it at such temperature for an appreciable period of time, and finally gradually reducing the temperature of the batch to normal.

8. The method of producing an optical glass substantially free from strain and the refractive index of which varies continuously through at least a portion thereof, comprising producing a thoroughly mixed molten batch containing different oxides of which one consists of a substantial quantity of cadmium oxide and said oxides being capable of rearrangement from a thoroughly mixed condition to a second condition effecting said varied index of refraction while the batch is in a molten quiescent state, then maintaining the batch in a molten quiescent state for a period of time to effect said second condition and comprising maintaining the batch at a relatively high temperature in which it is in a free flowing state for an appreciable period of time and then gradually reducing the temperature of the batch until it is in a viscous state, then reducing the temperature of the batch while it is still in a quiescent state to a temperature below and in the region of the solidifying temperature thereof and maintaining it at such temperature for an appreciable period of time, and finally gradually reducing the temperature of the batch to normal.

9. The method of producing an optical glass substantially free from strain and the refractive index of which varies continuously through at least a portion thereof, comprising producing a thoroughly mixed molten batch containing a substantial quantity of each of the oxides of boron, silicon, lanthanum, barium and cadmium and said oxides being capable of rearrangement from a thoroughly mixed condition to a second condition effecting said varied index of refraction while the batch is in a molten quiescent state, then maintaining the batch in a molten quiescent state for a period of time sufficient to effect said second condition and comprising maintaining the batch at a relatively high temperature in which it is in a free flowing state for an appreciable period of time and then gradually reducing the temperature of the batch until it is in a viscous state, then reducing the temperature of the batch while it is still in a quiescent state to a temperature below and in the region of the solidifying temperature thereof and maintaining it at such temperature for an appreciable period of time, and finally gradually reducing the temperature of the batch to normal.

10. The method of producing an optical glass substantially free from strain and the refractive index of which varies continuously through at least a portion thereof, comprising producing a thoroughly mixed molten batch containing a substantial quantity of each of the oxides of boron, silicon, lanthanum, barium and cadmium and a minor quantity of each of the oxides of beryllium and zirconium and said oxides being capable of rearrangement from a thoroughly mixed condition to a second condition effecting said varied index of refraction while the batch is in a molten quiescent state, then maintaining the batch in a molten quiescent state for a period of time sufficient to effect said second condition and comprising maintaining the batch at a relatively high temperature in which it is in a free flowing state for an appreciable period of time and then gradually reducing the temperature of the batch until it is in a viscous state, then reducing the temperature of the batch while it is still in a quiescent state to a temperature below and in the region of the solidifying temperature thereof and maintaining it at such temperature for an appreciable period of time, and finally gradually reducing the temperature of the batch to normal.

11. The method of producing an optical glass substantially free from strain and the refractive index of which varies continuously through at least a portion thereof, comprising producing a thoroughly mixed molten batch containing approximately 13.5% of boron oxide, 15% silicon oxide, 17% of lanthanum oxide, 34.8% of barium oxide, 13.3% of cadmium oxide, 4% of beryllium oxide and 2% of zirconium oxide and said oxides being capable of rearrangement from a thoroughly mixed condition to a second condition effecting said varied index of refraction while the batch is in a molten quiescent state, then maintaining the batch in a molten quiescent state for a period of time sufficient to effect said second condition and comprising maintaining the batch at approximately 1300° C. for approximately one hour and then gradually reducing the temperature of the batch to approximately 1090° C. in approximately forty minutes, then reducing the temperature of the batch while it is still in a quiescent state to approximately 600° C. and maintaining it at this temperature for approximately two hours, and finally gradually reducing the temperature of the batch to normal.

HAROLD H. SPIEGEL.

REFERENCES CITED

The following references are of record in the file of this patent:

UNITED STATES PATENTS

| Number | Name | Date |
|---|---|---|
| 1,173,688 | Thomson | Feb. 29, 1916 |
| 2,239,551 | Dalton et al. | Apr. 22, 1941 |
| 2,298,746 | Moulton | Oct. 13, 1942 |
| 2,422,472 | Dalton | June 17, 1947 |
| 2,434,148 | De Paolis | Jan. 6, 1948 |

OTHER REFERENCES

The Manufacture of Optical Glass and of Optical Systems, Ordnance Dept., Document No. 2037, pub. by Government Printing Office, Washington, D. C., 1921, pages 120, 128, 129, 132, and 134 to 137. (Copy in Scientific Library.)